(12) United States Patent
Wade et al.

(10) Patent No.: US 9,085,219 B2
(45) Date of Patent: Jul. 21, 2015

(54) WINDOW SURROUND FOR A VEHICLE

(71) Applicant: FORD GLOBAL TECHNOLOGIES, LLC, Dearborn, MI (US)

(72) Inventors: David Arthur Wade, Plymouth, MI (US); Gregory James Grudzinski, Perryburg, OH (US); Chester Stansilaus Walawender, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 13/866,050

(22) Filed: Apr. 19, 2013

(65) Prior Publication Data

US 2014/0312648 A1    Oct. 23, 2014

(51) Int. Cl.
| | |
|---|---|
| *B60J 1/17* | (2006.01) |
| *B60J 5/04* | (2006.01) |
| *B60J 10/08* | (2006.01) |
| *B60J 1/00* | (2006.01) |
| *B60J 10/04* | (2006.01) |
| *B29C 45/14* | (2006.01) |
| *B60J 1/20* | (2006.01) |
| *B60J 10/00* | (2006.01) |

(52) U.S. Cl.
CPC .......... *B60J 1/007* (2013.01); *B29C 45/14467* (2013.01); *B60J 1/20* (2013.01); *B60J 10/0014* (2013.01); *B60J 10/042* (2013.01); *B29C 2045/1454* (2013.01)

(58) Field of Classification Search
CPC .............................. B60J 1/007; B60J 10/0014
USPC .......................... 296/146.2; 49/440, 441, 502
See application file for complete search history.

(56) References Cited

U.S. PATENT DOCUMENTS

| | | | | |
|---|---|---|---|---|
| 1,903,225 | A * | 3/1933 | Palenske | 49/441 |
| 5,001,867 | A * | 3/1991 | Dupuy | 49/502 |
| 6,612,074 | B1 * | 9/2003 | Kaye et al. | 49/441 |
| 7,487,615 | B2 * | 2/2009 | Watanabe et al. | 49/441 |
| 8,037,640 | B2 * | 10/2011 | Boddy et al. | 49/506 |
| 2002/0108313 | A1 * | 8/2002 | Nozaki et al. | 49/441 |
| 2008/0178531 | A1 * | 7/2008 | Takeuchi et al. | 49/475.1 |
| 2010/0052359 | A1 * | 3/2010 | Ellis | 296/146.1 |
| 2012/0025564 | A1 * | 2/2012 | Ellis et al. | 296/146.9 |

* cited by examiner

*Primary Examiner* — Dennis H Pedder
(74) *Attorney, Agent, or Firm* — Joseph E. Root

(57) ABSTRACT

An integral window surround for a vehicle. The window surround includes upper, front, and rear glass runs for guiding and sealing a glass window, as well as a mirror sail for mounting a side mirror, and a B-pillar appliqué for providing decorative covering for the B-pillar. A belt molding extends across the bottom of the surround, with attachment means for securing the surround to the vehicle body. Sealing elements are also provided. If desired, an alternative implementation can be provided without the mirror sail, suitable for rear windows and windows that do not have a side mirror. The components of the surround are integral, which is accomplished by forming the surround in a two-shot molding process. The structural elements are molding in a first shot, and at that point decorative films can be inserted into the mold to provide a desired surface finish. The second shot forms the sealing elements.

9 Claims, 4 Drawing Sheets

WINDOW SURROUND FOR A VEHICLE

TECHNICAL FIELD

The present disclosure relates to an automotive window surround, and more particularly, to a window surround molded as an integral unit employing multi-shot injection molding techniques.

BACKGROUND

Automobile side windows are enclosed by a "window surround," a set of components that contribute either to the window's functionality or to its aesthetic appeal. A glass run, for example, provides a path on which the window glass can move up and down, and it also provides a means for interfacing with the window transport mechanism, which can be a hand crank or an electric motor. At the front corner of a front window, a mirror sail, so called because of its shape, provides a mounting base on which to affix a side mirror. Other elements provide aesthetic effects, such as a B-pillar appliqué, which provides a decorative cover for the B-pillar. Still other elements can contribute to both functions, such as the upper portion of the glass run, which can combine a decorative metallic or colored finish with the function of carrying the window glass.

At present, the various components of the window surround are manufactured separately, and are assembled prior to or during window manufacture. In either scenario, a number of separate elements must be assembled to form the window surround, a process that requires time and labor.

Reducing the time and cost of automobile manufacture is a continuing process, and taking operations out of that process is a continuing goal. Accordingly, there exists a need for a window surround that permits reduced assembly time and labor.

SUMMARY

An aspect of the present disclosure is a window surround for a vehicle, where the vehicle body includes a window opening carrying a glass window and further having an interior portion. The window surround includes an upper glass run as well as front and rear glass runs. The upper glass run has a notched portion dimensioned to accept an edge of the glass window, the upper glass run extending across an upper side of the window opening. The front and rear glass runs each has a first end integral with the upper glass run and a second end extending into the interior portion of the door, respectively located toward front and rear edges of the window opening and each dimensioned to accept an edge of the window glass. A belt molding, integral with and extending between the front and rear glass runs, is attached to the interior portion of the door adjacent to a lower edge of the window opening. A B-pillar appliqué is integral with and extends rearward from the rear glass run, and a mirror sail is integral with and extends forward from the front glass run, and is integral with and extends downward from the upper glass run. Sealing members are integrally molded into the window surround and positioned to create seals between the window surround and the glass window and seals between the window surround and the vehicle door.

A further aspect of the present disclosure is a window surround for a vehicle, where the vehicle body includes a window opening carrying a glass window and further having an interior portion. The window surround includes an upper glass run as well as front and rear glass runs. The upper glass run has a notched portion dimensioned to accept an edge of the glass window, the upper glass run extending across an upper side of the window opening. The front and rear glass runs each has a first end integral with the upper glass run and a second end extending into the interior portion of the door, respectively located toward front and rear edges of the window opening and each dimensioned to accept an edge of the window glass. A belt molding, integral with and extending between the front and rear glass runs, is attached to the interior portion of the door adjacent to a lower edge of the window opening. A B-pillar appliqué is integral with and extends rearward from the rear glass run. Sealing members are integrally molded into the window surround and positioned to create seals between the window surround and the glass window and seals between the window surround and the vehicle door.

Yet another aspect of the disclosure is a method for molding a window surround for a vehicle window opening. The method begins by molding structural elements in a first injection molding shot, employing a first injection mold. The molded structural elements include a number of components. A upper glass run has a notched portion dimensioned to accept an edge of a glass window, together with front and rear glass runs, each having a first end integral with the upper glass run and both dimensioned to accept an edge of the window glass. A belt molding is integral with and extends between the front and rear glass runs, and it is attached to the interior portion of the door adjacent to a lower edge of the window opening. A B-pillar appliqué is integral with and extends rearward from the rear glass run, and a mirror sail is integral with and extends forward from the front glass run. The mirror sail is also integral with and extends downward from the upper glass run. The method continues by molding a plurality of sealing members in a second injection molding shot. The second shot molds the sealing members integral with the structural members, positioned to create seals between the window surround and the glass window and seals between the window surround and a vehicle door.

These and other aspects, objects, and features of the present disclosure will be understood and appreciated by those skilled in the art upon studying the following specification, claims, and appended drawings.

BRIEF DESCRIPTION OF THE DRAWINGS

The figures described below set out and illustrate a number of exemplary embodiments of the disclosure. Throughout the drawings, like reference numerals refer identical or functionally similar elements. The drawings are illustrative in nature and not drawn to scale.

DETAILED DESCRIPTION

The following detailed description is made with reference to the figures. Exemplary embodiments are described to illustrate the subject matter of the disclosure, not to limit its scope, which is defined solely by the appended claims.

The terms such "forward" or "rearward," as well as "upward" and "downward," refer to a part, portion, or direction towards the front or rear, of the automobile.

Overview

In general, the present disclosure provides an integral window surround for installation on a side door window frame of an automobile. Primary components include upper, front, and rear glass runs, for guiding the window glass, a mirror sail for mounting a side mirror, a belt molding defining the lower portion of the surround, a B-pillar appliqué, and a number of seals. The seals provide a weathertight fit when the window is raised and the automobile door is shut. Seals may include a window surrounding seal, a margin seal, a glass run outer seal, and an outer belt seal. Rather than being assembled from subcomponents, the window surround is formed as a single unit, through multi-shot injection molding. During that process, film laminates may be placed in one of the mold bodies, so that decorative surfaces may be molded into the unit. The window surround of the present disclosure thus eliminates assembly steps, reducing manufacturing time, labor, and cost, while also providing enhanced aesthetics.

Exemplary Embodiments

Figure 1:
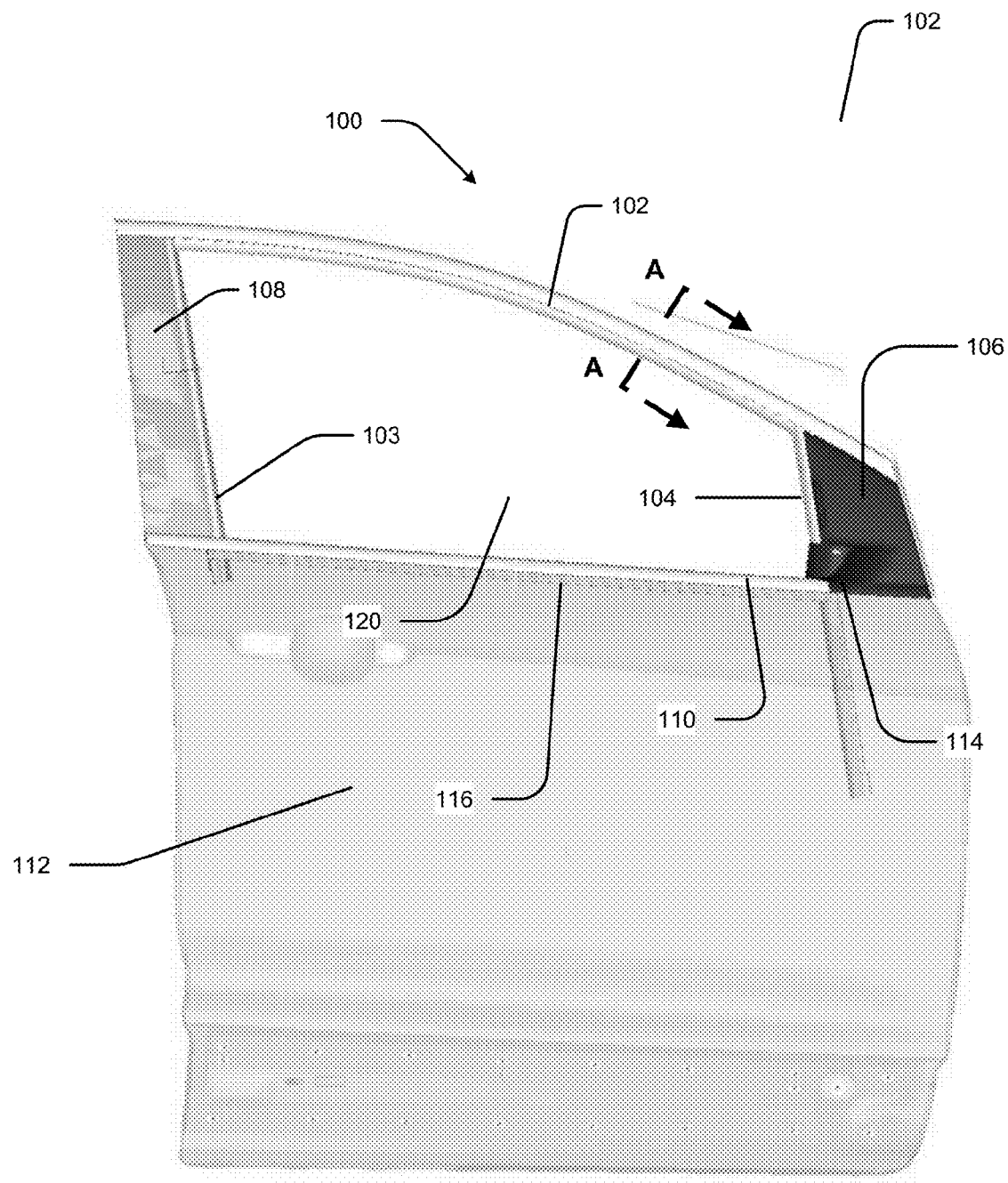
FIG. 1 is a front view of a window surround for installing on a side door window of an automobile in accordance with an exemplary embodiment of the present disclosure.

FIG. 1 is a front view of a window surround 100 according to an embodiment of the present disclosure, mounted in a vehicle front door 112. Generally, window surround 100 includes a upper glass run 102, extending across the top of the window opening 120 formed in door 112, front and rear glass runs 104, 103, and a belt molding 110, extending across the bottom of the window opening. It will be understood that the principles set out herein apply generally to vehicle windows, so that windows carried on a rear door, as well as windows on trucks, SUV's, and other vehicles could equally benefit from implementations of the present disclosure. Those of skill in the art will be able to adapt the teachings set out here and adapt those teachings to a variety of situations.

As noted above, an automotive window surround includes both functional and aesthetic elements. Functional elements can be divided into structural elements that support and guide the window itself, and sealing members that provide a seal around the window. In window surround 100, the first category of elements consists primarily of the portions of the glass run, which include a upper glass run 102, a front glass run 104, and a rear glass run 103. The upper glass run extends the length of the window opening, being dimensioned and sized to fit the top of the door's window opening. The front and rear glass runs 104 and 103, respectively, extend vertically downward from the upper glass run to belt molding 110, which extends across the bottom of the window opening. Details of these elements are set out below.

The vertical extent of front and rear glass runs 104 and 103 is sufficient to provide the selected degree of travel for glass window 120. Though not shown here, it will be understood that a mechanism may be provided in connection with the automobile door for raising and lowering the glass window 120. In older automobiles generally and in less expensive automobiles today, the raising and lowering mechanism takes the form of the well-known hand crank. Increasing numbers of automobiles employ an electric motor, controlled by a switch or button, to provide the motive force for propelling the window glass upward or downward. The interface between the window glass 120 and the vertical movement mechanism is well known in the art and will not be discussed further here.

It can be noted that vertical extensions of front and rear glass runs 104, 103 extend into the interior of door 112. That configuration allows the glass window 120 to travel up and down smoothly, sufficiently supported both front and rear.

A mirror sail 106 lies forward of the forward vertical glass run 104, integral with that element and with the forward portion of upper glass run 102. This element takes its name from its shape, which resembles several types of sails employed on sailboats. The mirror sail 106 carries a side mirror (not shown) on a mirror mount 114, and this element is formed in preparation for accepting paraphernalia associated with a mirror, such as the mirror mount itself and the wires or cables associated with the mirror control system. In most modern automobiles, the mirror orientation can be adjusted up and down and side to side by means of a cable, which physically moves the mirror, or by small electric motors which move the mirror in response to signals carried on electrical cables (not shown). If installed in a particular automobile, electrical connections for a mirror heating element can also be included, as is further known in the art. The mirror sail 106 can fulfill an aesthetic function by its surface finish and color, which can be either blend with or contrast with the color scheme of the rest of the automobile, as set out in more detail below.

As discussed in further detail below, mirror sail 106 can take a number of forms. The illustrated embodiment depicts mirror sail 106 as including only the cosmetic mirror sail cover integral with the window surround 100. That design would require a two-piece assembly, and the structural elements of the mirror base would have to be installed on the door prior to the window surround being mounted. Then, structural elements of the mirror head would be added after the window surround. Alternatively, both the cosmetic mirror sail cover and structural elements of the mirror base could be included in the window surround. That option would also require a two-piece mirror design, but the mirror base with the present as part of the window surround, requiring only that structural elements of the mirror head would be installed after installing window surround 100. In a further alternative embodiment, mirror sail 106 could be omitted altogether. Further detail is provided in connection with FIG. 4.

As noted, window surround 100 is formed as an integral element. Specific materials used in that formation, as well as techniques for achieving it, are discussed in more detail below.

A B-pillar appliqué 108 extends rearward from the rear vertical glass run 103. This element serves a primarily aesthetic function, overlapping that portion of the B-pillar covered by the rearward portion of the automobile door. The B-pillar appliqué 108 can be given a finish and color to either blend with or contrast with colors and the rest of the automobile. A highly reflective metallic finish is often seen as desirable for this element, and methods for achieving that result are described below. Contemporary automotive styling often prefers to create a distinct separation between the front and rear windows of an automobile, and here the B-pillar appliqué 108 provides an effective means for accomplishing that goal.

Belt molding 110 extends across the bottom of the glass window 120, extending at least from the mirror sail 106 to the B-pillar appliqué 108. In the embodiment illustrated here, belt molding 110 abuts against mirror sail 106 but extends all the way across the bottom of B-pillar appliqué 108. Snap fittings on belt molding 110, working together with snap fitting receptacles (not shown) on an outer upstanding flange (not shown) on door 112 to allow belt molding 110 to be snapped in place in a manner that both positions and secures window surround 100 on door 112. A quick attachment fastener, positioned to interact with a matching receptacle on the B-pillar, secures belt molding 110, and thus window surround 100, in place. Plainly, other designs and layouts of these components can be adopted by those in the art. Belt molding 110 primarily performs a sealing function, lying between the glass window 120 and the inner side of the automobile door 112. One or more door margin seal 116 may be provided above or below the belt molding 110 to ensure a weathertight seal around the window.

Figure 2:
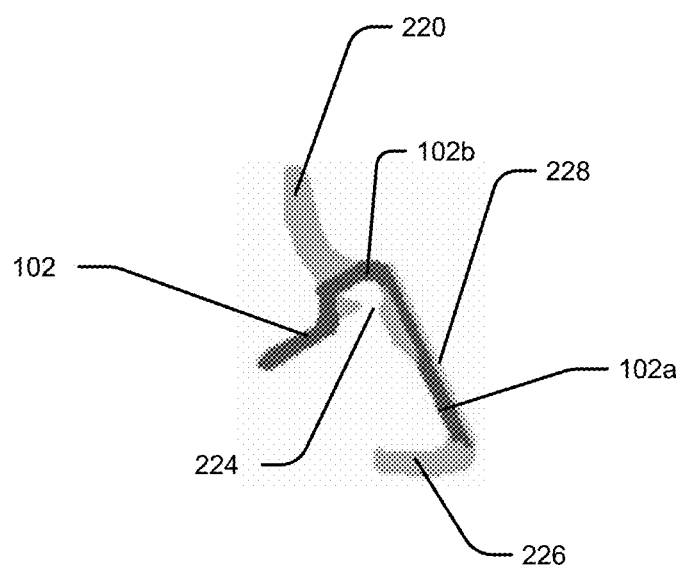
FIG. 2 is an detail section view taken along plane A-A of FIG. 1.

FIG. 2 is a cross-section of upper glass run 102, taken on plane A-A, in the upper rear corner of window surround 100. As seen here, a number of sealing elements are provided, both to provide a resilient interface between the glass window 120 and the rest of the automobile, and to ensure a watertight seal around the window surround 100. Upper glass run 102 includes both an overlap portion 102a, which extends downward over the edge of window glass 120 when that glass is in the raised position, and accepting notch 102b, dimensioned to accept the upper edge of window glass 120 and the raised position.

Several sealing elements are integral with the upper glass run 102. Surround seal 220 lies between the window surround 100 and the automotive body. An outer glass seal 226 bears against the edge of window glass 120 in its raised position, while locators 224, lying adjacent to the notched portion 102b of upper glass run 102, snugly accept the upper edge of glass window 120, holding it into the notched portion 102b and ensuring a tight seal around that window. Materials for the sealing elements will be discussed in further detail below.

It will be noted that the window surround 100 of the present disclosure differs from conventional window surrounds in the design of the glass runs. Unlike arrangements common in the prior art, glass runs 102-104 do not have sealing elements engaging both sides of the window glass 120. Rather, outer seal 226, formed from a flexible material, as set out below, bears against window glass 120 to form a weathertight seal. An inner seal (not shown) engages the inside of window glass 120 and a position generally opposite to that of outer seal 226. The inner seal is separate from window surround 100 and is installed before window surround 100.

Figure 3:
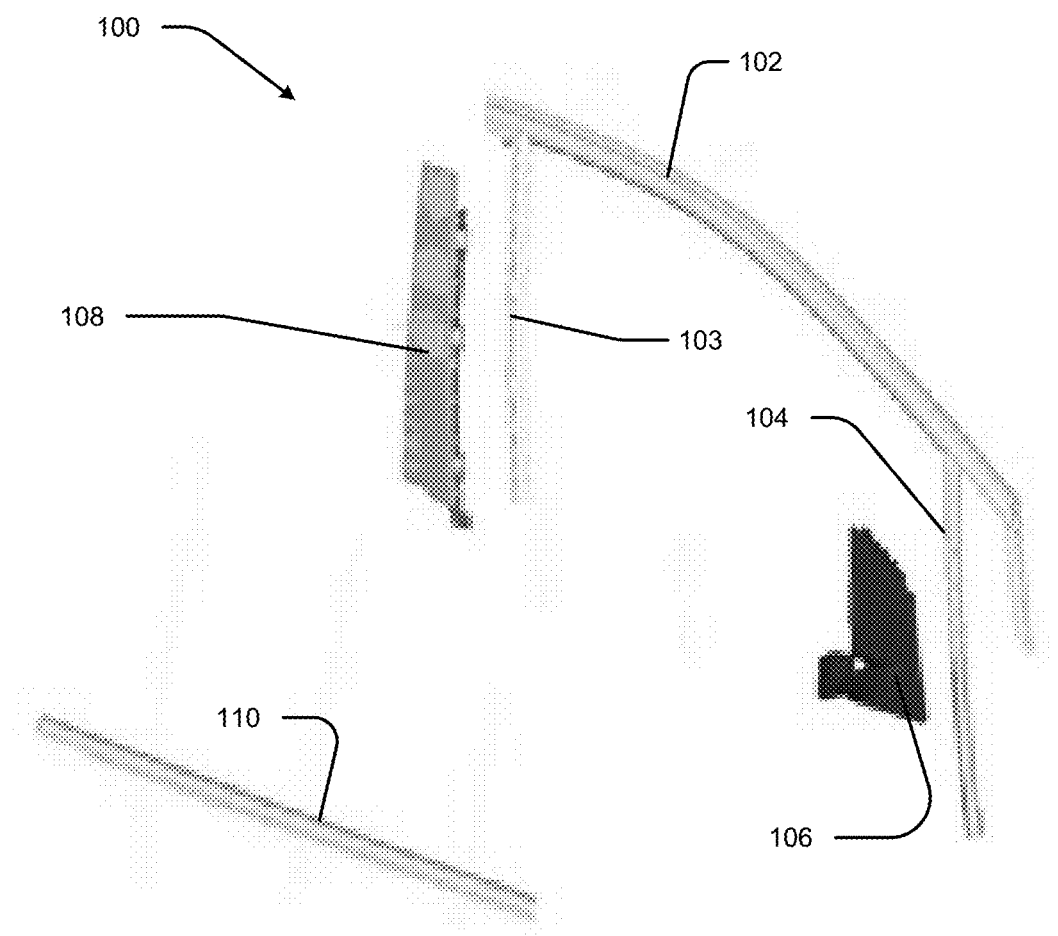
FIG. 3 is an exploded view of the window surround of FIG. 1.

FIG. 3 is an exploded view of window surround 100, providing an improved view of its elements. As explained in greater detail below, the exploded view of FIG. 3 is provided for improved visualization only. Those in the art will understand that window surround 100 of the present disclosure is molded into a single integral element; the various components cannot be removed from one another. Viewing each element in isolation, however, provides an increased understanding of the form and function of those elements.

The three glass runs, upper glass run 102, front glass run 104, and rear glass run 103, define the basic shape of the window surround 100. Based on current styling trends, top run 102 generally curves downward from rear to front, matching the profile of the window opening (FIG. 1). Thus, this run extends across the entire top of that opening. Front glass run 104 and rear glass run 103 extend vertically from upper glass run 12, providing parallel tracks for the window glass (FIG. 1) to travel up and down.

To the front and rear of the respective vertical glass runs are the mirror sail 106 and B-pillar appliqué 108. Each of these elements includes a body portion (mirror sail 106 and B-pillar appliqué 108), and a decorative surface (mirror sail film 106a, and B-pillar appliqué film 108a). In one embodiment, the surface portions can be formed by a film, molded into the surface of these elements. The film may be colored, to either blend or contrast with the remainder of the vehicle, or it may be a metallic silver color, designed to simulate a chromium-coated part. Upper glass run 102 may in some embodiments be provided with a metallic or simulated chromium finish as well.

These six elements—upper glass run 102, front glass run 104, rear glass run 103, mirror sail 106, B-pillar appliqué 108, and belt molding 110—are injection molded in a single shot operation. The molding material may be any suitable high-strength plastic, which in various embodiments may be ABS or PPTF20. Those of skill in the art will understand other suitable materials to use in this molding process. This first molding step produces the structural components of the window surround according to the present disclosure.

Decorative surfaces such as mirror sail color film 106a and B-pillar appliqué film 108a may be formed during the first shot molding process. To accomplish that result, decorative film is placed in the mold at appropriate points, so that the film will provide the surface for the chosen area, such as the surface of B-pillar appliqué 108. With the decorative film in position, the first shot molding process proceeds, so that the decorative film forms the surface of the locations where it is inserted in a mold. This process can produce a high-quality metallic finish at considerably lower cost than would be experienced in providing a full metallic finish to an individual part.

A second shot molding process adds sealing elements to the integral structure produced by the first shot molding process. Thus, the second shot molding process forms door margin seal 116 (FIG. 2), surround seal 220 (FIG. 2), outer glass seal 226 (FIG. 2), and locators 224 (FIG. 2). Sealing members are molded from an appropriate material to provide a long-lasting, resilient material capable of providing effective seals over the life of the automobile. An effective choice for that material may be thermoplastic vulcanizate (TPV), although other materials, now available or heretofore developed, may be employed as desired by those of skill in the art in particular embodiments.

Figure 4:
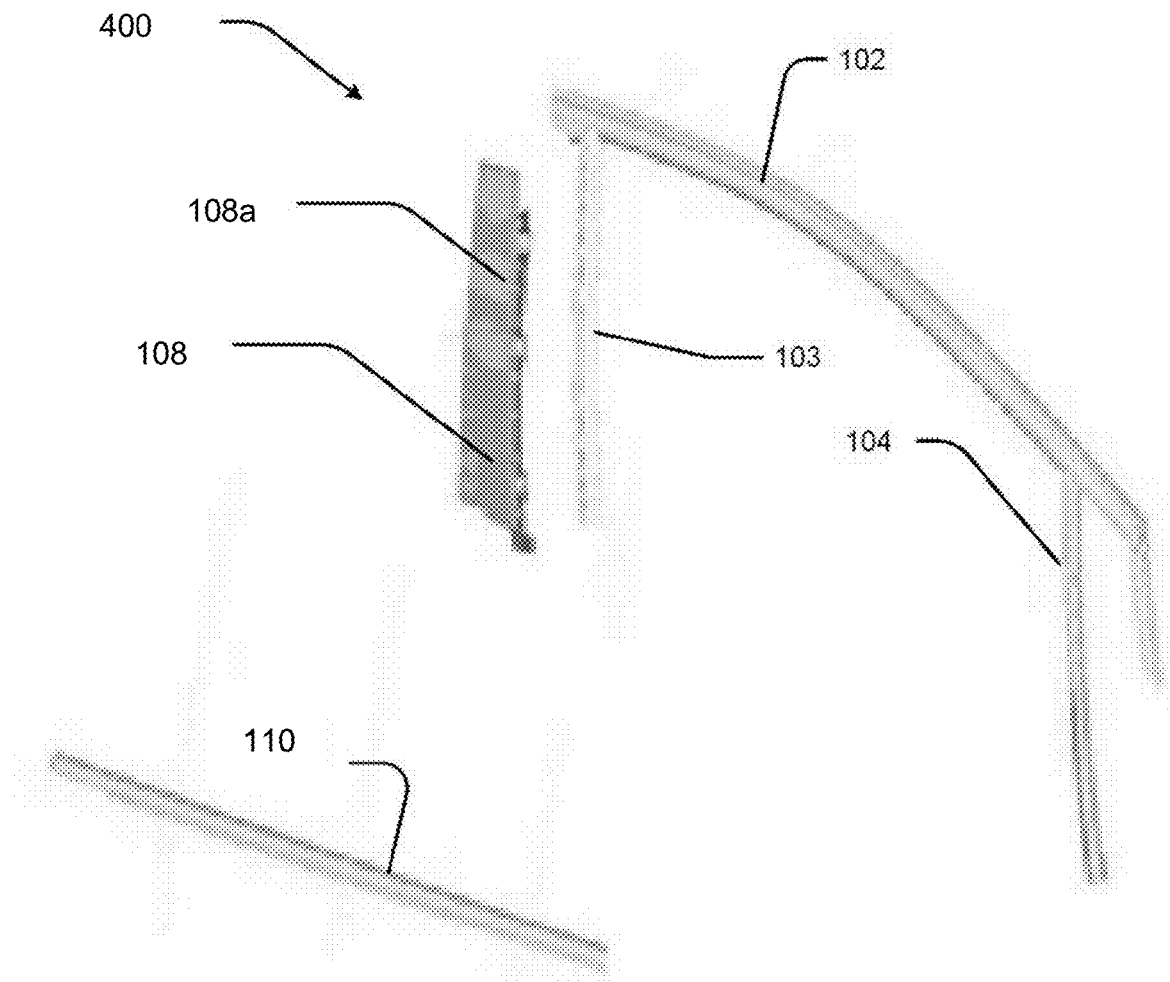
FIG. 4 depicts an alternate embodiment of a window surround according to the present disclosure.

FIG. 4 depicts an alternative embodiment, window surround 400, according to the present disclosure. Here, as discussed above in connection with FIG. 1, the mirror surround employed in previous embodiments is not included. Rather, window surround 400 includes no mirror mount and all—the window glass extends all the way forward to forward glass run 104. Otherwise, components of the window surround remain as disclosed above.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A window surround for a vehicle body window opening, the vehicle body having a door carrying a glass window and further having an interior portion, the window surround comprising:
    an upper glass run, having a notched portion dimensioned to accept an edge of the glass window, the upper glass run extending across an upper side of the window opening;
    front and rear glass runs, each having a first end integral with the upper glass run and a second end extending into the interior portion of the door, structured and dimensioned to accept raising and lowering of the glass window, respectively located toward front and rear edges of the window opening and each dimensioned to accept an edge of the window glass;

a belt molding integral with and extending between the front and rear glass runs, attached to the interior portion of the door adjacent to a lower edge of the window opening;

a B-pillar appliqué, integral with and extending rearward from the rear glass run;

a mirror sail integral with and extending forward from the front glass run, and integral with and extending downward from the upper glass run; and a plurality of sealing members, integrally molded into the window surround and positioned to seal the window surround to the glass window and the vehicle door;

wherein the upper glass run, front glass run, rear glass run, mirror sail, B-pillar applique, and belt molding comprise a single molded piece.

2. The window surround of claim 1, wherein the mirror sail includes a mirror sail cover and a mirror base.

3. The window surround of claim 1, wherein the B-pillar appliqué includes an integrally molded finish element.

4. The window surround of claim 1, wherein the upper glass run further includes a surround seal, positioned between the window surround and the vehicle body; an outer glass seal bearing against an outside service of the glass window; and locators lying adjacent to the upper glass run notched portion, for accepting the edge of the glass window.

5. The window surround of claim 1, wherein the window surround is formed of materials including a high-strength plastic and thermoplastic vulcanizate (TPV).

6. A window surround for a vehicle body window opening, the vehicle having a door carrying a glass window and further having an interior portion, the window surround comprising:

a upper glass run, having a notched portion dimensioned to accept an edge of the glass window, the upper glass run extending across an upper side of the window opening;

front and rear glass runs, each integrally molded together with the upper glass run and extending into the interior portion of the door, structured and dimensioned to accept raising and lowering of the glass window, respectively located toward front and rear edges of the window opening and each dimensioned to accept an edge of the window glass;

a belt molding integrally molded together with and extending between the front and rear glass runs, attached to the interior portion of the door adjacent to a lower edge of the window opening;

a B-pillar appliqué, integrally molded together with and extending rearward from the rear glass run; and a plurality of sealing members, integrally molded into the window surround and positioned to seal the window surround to the glass window and the vehicle door.

7. The window surround of claim 6, wherein the window surround is formed of materials including a high-strength plastic and thermoplastic vulcanizate (TPV).

8. The window surround of claim 6, wherein the B-pillar appliqué includes an integrally molded finish element.

9. The window surround of claim 6, wherein the upper glass run further includes a surround seal, positioned between the window surround and the vehicle body; an outer glass seal bearing against an outside service of the glass window; and locators lying adjacent to the upper glass run notched portion, for accepting the edge of the glass window.

* * * * *